United States Patent
Cheng

(10) Patent No.: US 11,678,372 B1
(45) Date of Patent: Jun. 13, 2023

(54) SYSTEM AND METHOD FOR HIDDEN NODE RESOLUTION VIA COLLISION AVOIDANCE IN 4G AUTOMATIC LINK ESTABLISHMENT (ALE) STATIONS

(71) Applicant: Rockwell Collins, Inc., Cedar Rapids, IA (US)

(72) Inventor: Ho Ting Cheng, Stittsville (CA)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/537,210

(22) Filed: Nov. 29, 2021

(51) Int. Cl.
*H04W 74/08* (2009.01)
*H04W 52/24* (2009.01)
*H04W 76/10* (2018.01)

(52) U.S. Cl.
CPC ..... *H04W 74/0816* (2013.01); *H04W 52/243* (2013.01); *H04W 76/10* (2018.02)

(58) Field of Classification Search
CPC ............. H04W 74/0816; H04W 76/10; H04W 52/243
See application file for complete search history.

(56) References Cited

U.S. PATENT DOCUMENTS

| 10,014,979 B2 | 7/2018 | Wentink |
| 10,492,165 B2 | 11/2019 | Bar-Shalom et al. |
| 2016/0330759 A1 | 11/2016 | Hirsch et al. |
| 2021/0235514 A1 | 7/2021 | Cheng |

FOREIGN PATENT DOCUMENTS

| AU | 2002309504 A1 | 10/2002 |
| DE | 602016041608 | 8/2020 |
| EP | 2111000 A1 | 10/2009 |
| EP | 3252977 B1 | 2/2021 |
| WO | 2017052602 A1 | 3/2017 |

OTHER PUBLICATIONS

U.S. Appl. No. 17/220,506, filed Apr. 1, 2021, Cheng et al.
Argumanez, Humberto Escudero and M. Tschauner. "Tactical communication systems based on civil standards: Modeling in the MiXiM framework." ArXiv abs/1409.1006 (2014).
Department of Defense Interface Standard, MIL-STD-188-141D, "Inoperability and Performance Standards for Medium and High Frequency Radio Systems", Appendix G, Dec. 27, 2011, pp. 315-336.
Extended European Search Report dated Mar. 22, 2023; European Application No. 22209991.3.

*Primary Examiner* — James P Duffy
(74) *Attorney, Agent, or Firm* — Suiter Swantz pc llo

(57) ABSTRACT

A system and method for collision avoidance within nodes of an Automatic Link Exchange (ALE) network establishes a handshake between transmitting and receiving nodes for a linked call over an assigned frequency band. The transmitting and receiving nodes mutually determine transmission and reception sub-channel vectors within the assigned frequency band, e.g., for calling and response. Before the linked call commences, and when other scanning stations of the ALE network dwell on the assigned frequency band, the transmitting and receiving nodes transmit collision avoidance protocol data units (PDU) identifying the nodes, the transmission and reception sub-channel vectors, and the duration of the linked call such that scanning nodes may prevent interference with the linked call by avoiding transmission over the identified sub-channels.

14 Claims, 6 Drawing Sheets

SYSTEM AND METHOD FOR HIDDEN NODE RESOLUTION VIA COLLISION AVOIDANCE IN 4G AUTOMATIC LINK ESTABLISHMENT (ALE) STATIONS

TECHNICAL FIELD

The subject matter disclosed herein is directed generally to tactical radio communications and more particularly to prevention of interference with linked calls over Automatic Link Establishment (ALE) networks.

BACKGROUND

Performance standards and parameters outlined in MIL-STD-188-141D for long-haul and tactical radio systems communicating in the medium frequency (MF; e.g., between 0.3 MHz and 3 MHz) and high frequency (HF; e.g., between 3 MHz and 30 MHz) bands provide protocols and performance requirements for Automatic Link Establishment (ALE) systems and networks, the most current version of which is fourth generation (4G) ALE, or Wideband ALE (WALE).

To avoid interference with ongoing active communications links between nodes of an ALE network, caller and called nodes of the ALE network establishing a new linked call must first perform channel sensing before initiating a linked call (or responding to a linked call) to ensure that the assigned calling channel is not occupied by ongoing traffic. Caller nodes perform listen-before-transmit (LBT) operations, and called nodes perform listen-before-responding (LBR) approaches. However, these measures may not always prevent a "hidden node" problem after a call is linked, whereby a third node, unaware of a linked call between two nodes, initiates its own linked call and creates interference at a node of the original linked call, adversely affecting its bit error rate (BER) performance.

SUMMARY

In a first aspect, a participating node (participating unit, PU, calling PU) of an Automatic Link Exchange (ALE) network is disclosed. In embodiments, the PU includes an ALE radio system capable of receiving an assigned frequency band (e.g., ALE channel) for initiating a linked call to a partner node (e.g., receiving node, called PU) of the network. The calling and called PUs mutually determine a transmission channel and a reception channel within the assigned frequency band, the transmission and reception channels including a subset of sub-channel vectors within the assigned frequency band. During a dwell time when the assigned frequency band is scanned by other nodes within the ALE network (e.g., after a handshake is completed between the calling and called PUs but before data transmission commences) the PU transmits within the assigned frequency band one or more collision avoidance (CA) protocol data units (PDU). Each CA PDU identifies the calling node and includes a priority level and maximum duration of the linked call. Each CA PDU identifies the agreed-upon transmission and reception channels to be used for the linked call, such that proximate nodes that may not have been aware of the linked call may avoid causing interference with the linked call during its likely duration.

In some embodiments, the ALE network is not perfectly time-synchronized, and the transmitting PU ensures all scanning nodes can receive the CA PDU by transmitting at least D (N+2) CA PDUs, where D is a minimum dwell time duration and N is the number of channels on the scanlist for the ALE network.

In some embodiments, the transmitting PU may append one or more text messages to the CA PDU.

In some embodiments, the transmitting PU increases or decreases its transmission power when transmitting the CA PDU in order to increase or decrease the collision avoidance range, e.g., based on an interference tolerance of the linked call.

In some embodiments, the transmitting PU is the calling PU, and transmits the CA PDU via the established transmission channel.

In some embodiments, the transmitting PU is the called (receiving) PU, and transmits the CA PDU via the established reception channel (e.g., the channel used by the receiving PU for transmissions associated with the linked call).

In a further aspect, a method for collision avoidance between a calling PU and other PUs of an ALE network is also disclosed. In embodiments, the method includes receiving an assigned frequency band (ALE channel) for a linked call between the calling PU and a called PU (e.g., receiving PU) of the ALE network. The method includes establishing a secure link from the calling PU to the called PU via the assigned ALE channel. The method includes determining, via the calling PU in collaboration with the called PU, a transmission channel and reception channel within the ALE channel for use associated with the linked call, the transmission and reception channels each comprising a band of sub-channel vectors within the assigned ALE channel. The method includes, during a dwell time between the completion of an ALE handshake between the calling and called PUs and the commencement of data transmission associated with the linked call, transmitting via the assigned ALE channel a collision avoidance (CA) PDU including: a unique identifier of the transmitting PU; a priority level and maximum duration associated with the linked call, and identifiers for the transmission and reception channels (e.g., which sub-channel vectors of the assigned ALE channel will be used for transmission and reception by the transmitting node).

In some embodiments, the method includes transmission (via the calling PU) of the CA PDU via the determined transmission channel.

In some embodiments, the method includes adjusting (via the calling PU) of transmission power when transmitting the CA PDU, e.g., based on a desired collision avoidance range or based on the interference tolerance of the linked call.

In some embodiments, the method includes appending at least one text message to the CA PDU.

In some embodiments, the method includes transmitting (via the calling PU) at least D (N+2) CA PDUs, where D is a minimum dwell time and N is the number of channels in the ALE network's scanlist.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
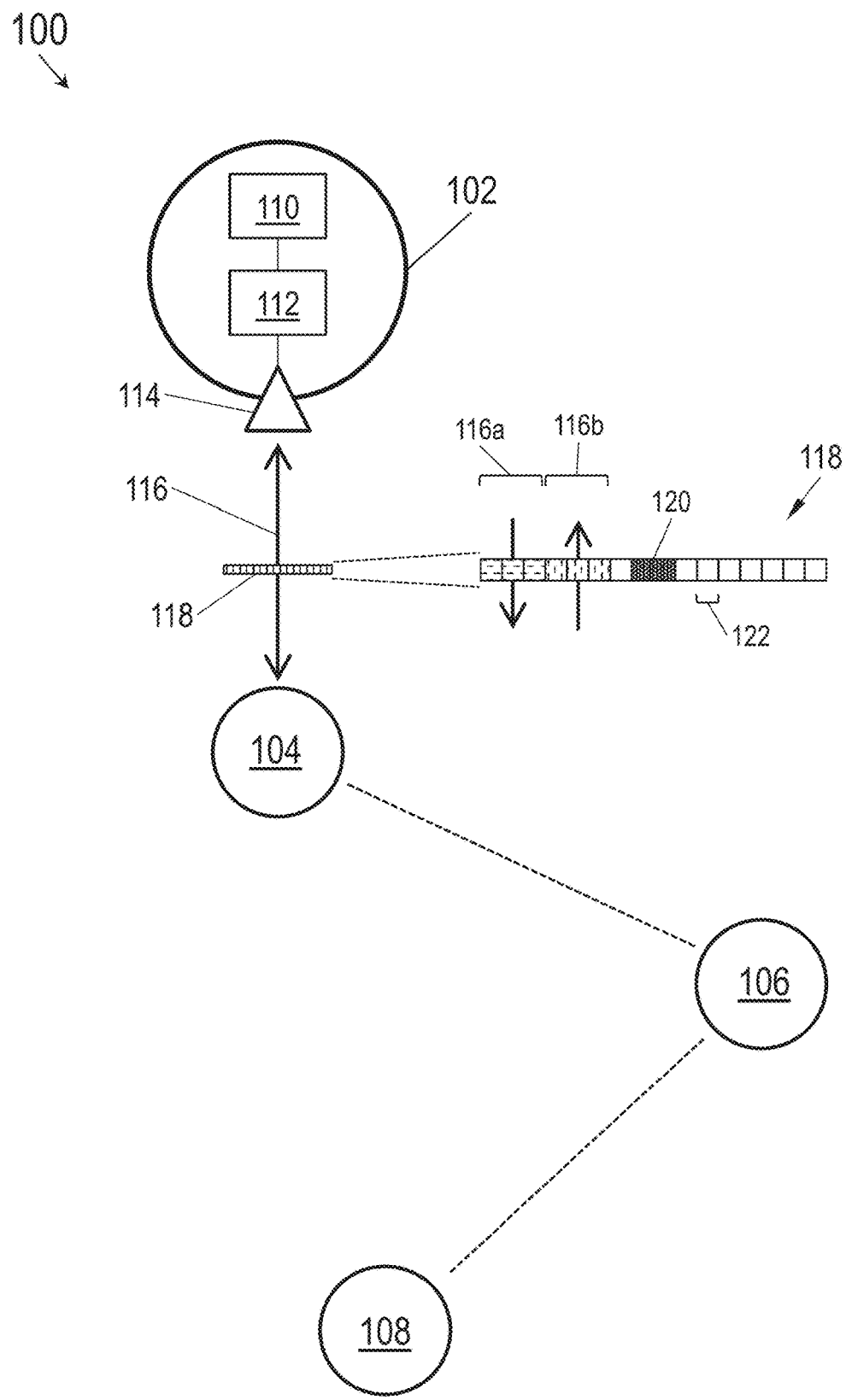
FIG. 1 is a diagrammatic illustration of an Automatic Link Exchange (ALE) network according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, a system and method for preventing "hidden node" problems within ALE networks is disclosed. Participating nodes initiating a linked call transmit collision avoidance information before initiating a transmission, providing information about the linked call to other nodes within the network so that the other nodes can avoid creating interference with the linked call.

FIG. 1—Network Generally

Referring to FIG. 1, an automatic link establishment (ALE) network 100 is shown. The ALE network may include participating units (PU; e.g., nodes) 102, 104, 106, 108.

In embodiments, the ALE network 100 may be a 4G ALE (e.g., WALE) network. For example, each PU 102, 104, 106, 108 may comprise a 4G ALE radio system configured for scanning through a series of ALE channels (e.g., adjacent frequency bands generally up to 48 kHz in width, each frequency band comprising a series of adjacent 3 kHz sub-channels) as provided for by MIL-STD-188-141D. Each PU 102, 104, 106, 108 may include control processors 110, transceiver equipment 112 (e.g., signal filters, signal amplifiers), and antenna elements 114 for transmitting and receiving data along MF, HF, Wideband HF (WBHF), ALE, and/or WALE channels.

In embodiments, a caller PU 102 (e.g., calling node, transmitting PU (TxPU)) may initiate a linked call 116 to a called PU 104 (e.g., callee node, receiving PU (RxPU)) over a 4G ALE channel 118 (e.g., WALE channel) assigned by an automatic channel selection (ACS) function. By way of a non-limiting example, the ALE channel 118 may be a simplex wideband channel comprising a frequency band centered on an assigned frequency 120 and incorporating multiple sub-channel vectors 122 (e.g., 1.5 kHz, 3 kHz) within the frequency band, either higher or lower than the assigned frequency. For example, a 16-vector WALE channel 118 (e.g., incorporating 16 sub-channel vectors 122 of 3 kHz each) may cover a range of 48 kHz.

In embodiments, the calling PU 102 may first listen before transmitting (LBT; e.g., to ensure the absence of other traffic and/or evaluate interference characteristics on the specified ALE channel 118) and, if the channel is unoccupied, transmit a link setup (LSU) request (LSU_REQ) protocol data unit (PDU) to the called PU 104 including sub-channel vectors 122 available to the calling PU. Similarly, the called PU 104, upon receipt of the link setup LSU_REQ PDU, may listen before responding (LBR) to evaluate interference characteristics and confirm the ALE channel 118 is unoccupied, and (if unoccupied) respond to the LSU_REQ PDU with a link setup confirmation (LSU_CONF) PDU including, e.g., signal to noise ratio (SNR) measured on the transmission of the link setup request. These successful steps complete an ALE/WALE handshake. In embodiments, after completion of the handshake the calling PU 102 and called PU 104 may mutually negotiate the transmission (Tx) channel 116*a* and the reception (Rx) channel 116*b*, the Tx and Rx channels each comprising a set of specific sub-channel vectors 122 to be used for transmissions from the calling PU to the called PU and the specific sub-channel vectors to be used for transmissions from the called PU to the calling PU. For example, the Tx and Rx channels 116*a*, 116*b* with respect to (e.g., from the perspective of) the calling PU 102 may respectively be the Rx and Tx channels with respect to the called PU 104, as explained below. In some embodiments, negotiations for usable traffic may include a negotiated bit error rate (BER).

In embodiments, the ALE network 100 may operate synchronously or asynchronously, depending upon whether or not the network has perfect time synchronization among its PUs 102, 104, 106, 108. For example, when operating synchronously, all PUs 102, 104, 106, 108 may dwell on, or synchronously scan, a particular ALE channel 118 for a specific dwell time; when the dwell time for the Mth ALE channel ends (where M is an integer), the dwell time for the (M+1)th ALE channel begins. When a calling PU 102 is directed to establish a linked call 116 with the called PU 104, for example, the transmission of the LSU_REQ PDU may be timed to occur $T_{TxOffsetTLC}$ after the beginning of a dwell time (e.g., where $T_{TxOffsetTLC}$ is a time delay generally expressed in milliseconds and dependent on various network performance factors).

In embodiments, the ALE network 100 may not provide for complete connectivity between all PUs 102, 104, 106, 108. For example, each PU may be configured for communication only with its one-hop neighbors but not with other PUs of the network: the PU 102 may communicate with its one-hop neighbor PU 104; the PU 104 with its one-hop neighbor PUs 102, 106; the PU 106 with its one-hop neighbor PUs 104, 108; and the PU 108 with its one-hop neighbor PU 106.

Figure 2:
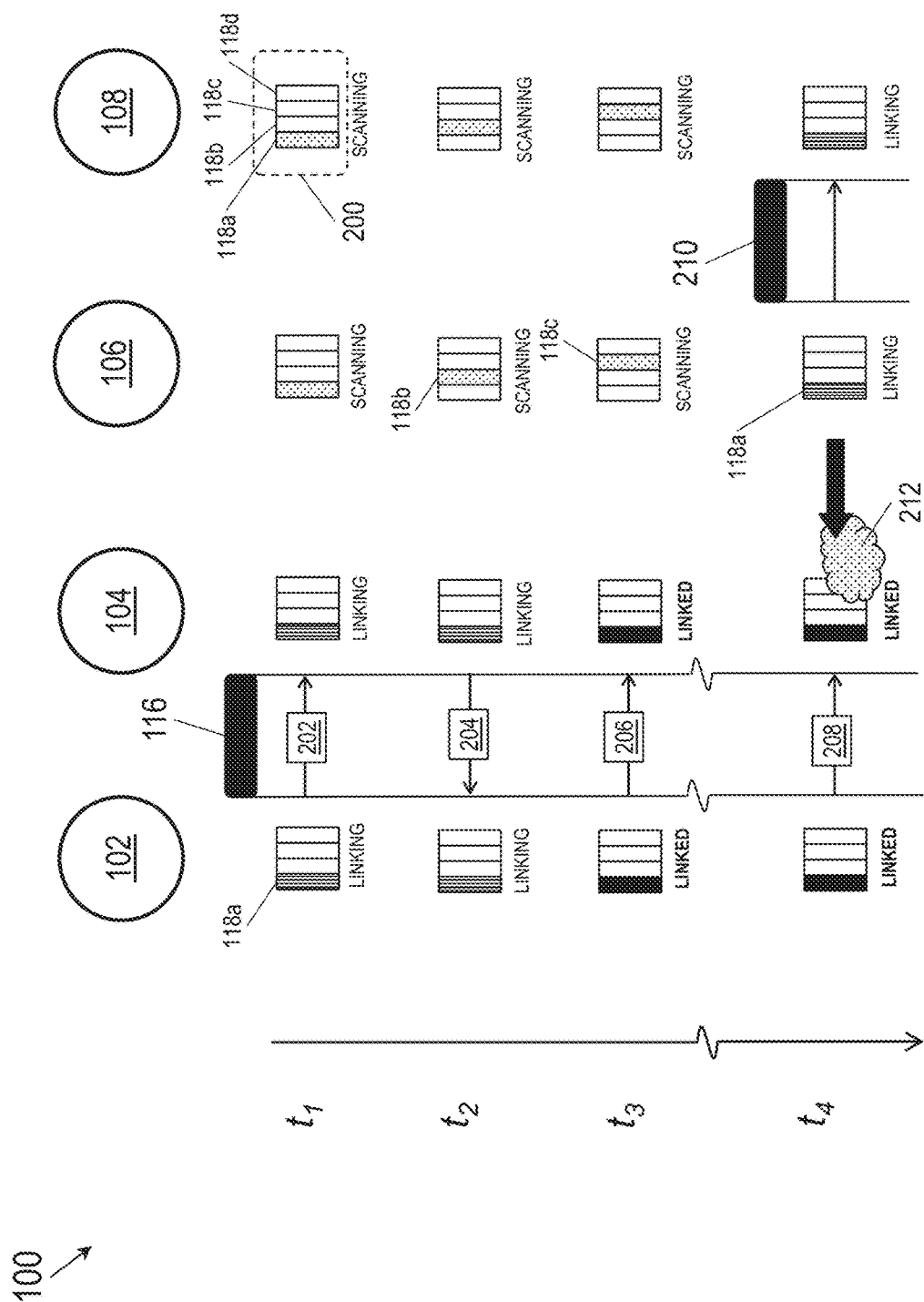
FIG. 2 is a diagrammatic illustration of potential interference resulting from linking operations of the ALE network of FIG. 1.

FIG. 2—Hidden Node Problem

Referring now to FIG. 2, the ALE network 100 is shown. In embodiments, the ALE network 100 may be associated with a scanlist 200 comprising 4 ALE channels 118*a-d*.

Given the configuration ALE network 100 as shown by FIG. 1, if two one-hop neighbor nodes initiate a linked call therebetween, a "hidden node" (e.g., which may be a one-hop neighbor with respect to the called node, but not with respect to the calling node) may fail to detect interference associated with transmissions by the calling node. When this hidden node, unaware of the ongoing linked call, then initiates a linked call to another participating node, this new linked call may create interference at the called node, adversely affecting the bit error rate (BER) performance of the original linked call.

For example, at a time $t_1$ (e.g., the beginning of a dwell time corresponding to the first ALE channel 118*a*, during which the PUs 106, 108 may be directed to scan the first ALE channel) the calling PU 102 is directed to initiate a linked call 116 with its one-hop neighbor, the called PU 104, on the first ALE channel 118*a*. The calling PU 102 may initiate a handshake by transmitting an LSU_REQ PDU 202 to the called PU 104 on the first ALE channel 118*a*. However, as the PU 106 is not within the coverage area of the calling PU 102 (e.g., as the two PUs 102, 106 are not one-hop neighbors), the PU 106 may not detect any undue interference while scanning the first ALE channel 118*a*, and therefore may not be aware of the LSU_REQ PDU 202 transmitted by the PU 102 on the first ALE channel.

At times $t_2$ and $t_3$, the PUs 106, 108 may dwell on (e.g., scan) the second and third ALE channels 118*b-c*. Simultaneously at time $t_2$ the called PU 104 may transmit a LSU_CONF PDU 204 to the calling PU 102 (e.g., in response to the LSU_REQ PDU 202), and at time $t_3$ the linked call 116 from the calling PU 102 to the called PU 104 may be finalized by the determination of usable sub-channel vectors and negotiation of a BER/data rate (206) over the first ALE channel 118*a*. At time $t_4$ the calling PU 102 may initiate user data transmission (208) to the called PU 104 via the linked call 116, but the PU 106 may still be unaware of the linked call. For example, if at the time $t_4$ the PU 106 initiates a subsequent linked call 210 to the PU 108 on the first ALE channel 118*a*, the transmission of the LSU_REQ PDU 202*a* by the PU 106 may cause potential interference (212) at the called PU 104 (a one-hop neighbor of the PU 106). The potential interference 212 caused by the subsequent linked call 210 may endanger the negotiated BER performance for the original linked call 116, resulting in bit errors and/or poor network utilization.

Figure 3:
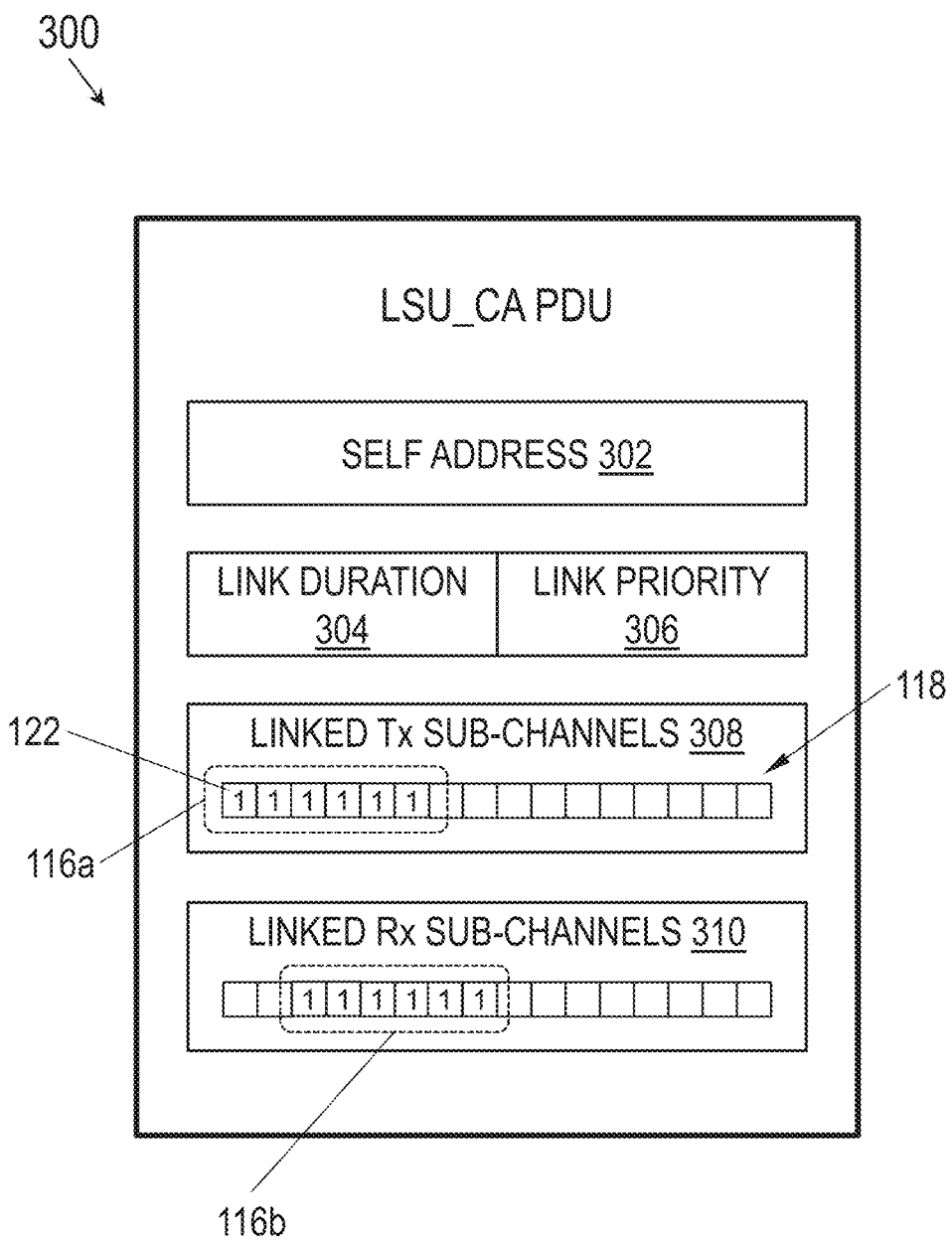
FIG. 3 is a block diagram illustrating a collision avoidance protocol data unit (PDU) of the ALE network of FIG. 1.

FIG. 3—LSU Collision Avoidance PDU

Referring also to FIG. 3, a link setup (LSU) collision avoidance (CA) PDU 300 (LSU_CA PDU) is shown.

In embodiments, the PUs (102, 104, 106, 108; FIG. 1) of the ALE network (100, FIG. 1) may prevent the hidden node problem illustrated by FIG. 2 by transmitting one or more LSU_CA PDU 300. For example, when the calling PU 102 and called PU 104 initiate a linked call (116, FIG. 1), both the calling PU and called PU may transmit (via their respective Tx channels (116*a*, 116*b*; FIG. 1)) one or more instances of the LSU_CA PDU 300 to provide information about the linked call 116 to other PUs 106, 108 of the ALE network 100, such that the other PUs may take steps to avoid creating potential interference (212, FIG. 2) with the linked call. In embodiments, the LSU_CA PDU 300 may include a self-address field 302 indicating an address (e.g., binary address) or other identifier uniquely identifying the PU transmitting the LSU_CA PDU (e.g., either the calling PU 102 or the called PU 104).

In embodiments, the LSU_CA PDU 300 may include fields similar to those of other PDUs described by MIL-STD-188-141D, except that the LSU_CA PDU 300 may include a link duration field 304 indicative of the maximum duration of the linked call 116. Similarly, in embodiments the LSU_CA PDU 300 may include a link priority field 306 indicative of a priority level of the linked call 116.

In embodiments, the LSU_CA PDU 300 may include a linked transmission (Tx) sub-channel field 308 and a linked reception (Rx) sub-channel field 310. For example, the linked Tx sub-channel field 308 may indicate which sub-channel vectors 122 of the ALE channel 118 assigned to the linked call 116 comprise the negotiated transmission channel, or the sub-channel vectors the PU transmitting the LSU_CA PDU 300 will use for transmission during the linked call. In embodiments, if the LSU_CA PDU 300 is transmitted by the calling PU 102, the linked Tx sub-channel field 308 may indicate the transmission channel 116*a* of the calling PU, e.g., which sub-channel vectors 122 of the assigned ALE channel 118 will be used for user data transmission. Similarly, the linked Rx sub-channel field 310 may indicate the sub-channel vectors 122 of the assigned ALE channel 118 comprising the negotiated reception channel 116*b* of the calling PU, e.g., the sub-channel vectors to be used by the calling PU for reception of responses transmitted by the called PU 104 during the linked call 116. Similarly, with respect to a LSU_CA PDU 300 transmitted by the called PU 104, the linked Tx sub-channel field 308 may indicate the transmission channel 116*b* of the called PU, e.g., the sub-channel vectors 122 of the assigned ALE channel 118 used by the called PU to transmit responses to the calling PU 102. Similarly, the linked Rx sub-channel field 310 may indicate the sub-channel vectors 122 of the assigned ALE channel 118 comprising the reception channel 116a of the called PU, e.g., the sub-channel vectors to be used by the called PU for reception of user data transmitted by the called PU 104 during the linked call on its Tx channel.

In some embodiments, the sub-channel vectors indicated by the linked Tx sub-channel field 308 and the linked Rx sub-channel field 310 (e.g., the negotiated transmission and reception bands) may overlap. With respect to either the linked Tx sub-channel field 308 or the linked Rx sub-channel field 310, if, for example, the assigned ALE channel 118 is a 48 kHz WALE channel comprising 16 sub-channels 122 of 3 kHz each, the linked Tx sub-channel field and linked Rx sub-channel field may each indicate usable sub-channel vectors by setting a corresponding element (e.g., component bit) to 1, and an unused sub-channel vector by setting the element to 0. If, for example, the entire 48 kHz assigned ALE channel 118 is available, the calling PU 102 and called PU 104 may both use the full 48 kHz band for transmission and reception, and each element of the linked Tx sub-channel field 308 and the linked Rx sub-channel field 310 (corresponding to the sub-channel vectors 122 of the assigned ALE channel) may be set to 1.

In embodiments, any PU 106, 108 of the ALE network 100 receiving a LSU_CA PDU 300 may stop scanning (e.g., upon detecting a transmitted preamble of the LSU_CA PDU) and parse the LSU_CA PDU, logging the node, link, and sub-channel information received therefrom and refraining from initiating subsequent link setups and/or linked calls (210, FIG. 2) over any overlapping reception band indicated by the linked Rx sub-channel field 310 unless otherwise excepted from avoiding potential interference 212. For example, if another PU 106, 108 receives a call request of higher priority than indicated by the link priority field 306, the PU may initiate a subsequent linked call 210 without regard to any potential interference 212 that may result with respect to other proximate PUs or linked calls. Alternatively, or additionally, the PUs 106, 108 may disregard any node, link, and sub-channel information provided by the LSU_CA PDU 300, and clear said node, link, and sub-channel information from memory, if the maximum duration indicated by the link duration field 304 has expired. Similarly, if override mode is enabled for the ALE network 100 (e.g., by network configuration files), the PUs 106, 108 may disregard node and sub-channel information provided by the LSU_CA PDU 300 and initiate a link setup or subsequent linked call 210 without regard to potential interference 212 that may result. In embodiments, after receiving and parsing the LSU_CA PDU 300, the PUs 106, 108 may be free to continue scanning operations.

In some embodiments, the PU 106 may decode the LSU_CA PDU 300 to derive link quality analysis (LQA) information, e.g., as provided by commonly owned U.S. patent application Ser. No. 17/220,506, which is herein incorporated by reference in its entirety. For example, automatic channel selection (ACS) operations at the PU 106 may consider LQA information and/or Tx sub-channel information provided by the linked Tx sub-channel field 308 in selecting an ALE channel (118a-d, FIG. 2) best suited for a subsequent linked call 210 to the PU 108.

In embodiments, the calling PU 102 and called PU 104 may each transmit one or more LSU_CA PDU 300 for a linked call 116 after the handshake is completed, but before transmission of user data (208, FIG. 2) by either the calling PU or the called PU is initiated. For example, if the ALE network 100 is a time-synchronized network, the calling PU 102 and called PU 104 may each transmit a LSU_CA PDU 300 when other PUs 106, 108 of the ALE network 100 are dwelling on the assigned ALE channel 118, e.g., after a delay of $T_{TxOffsetTLC}$ following the beginning of the first dwell time corresponding to the assigned ALE channel after the handshake is completed.

In embodiments, if the ALE network 100 is an asynchronous network without perfect time synchronization, the calling PU 102 and called PU 104 may guarantee that the PUs 106, 108 will scan the assigned ALE channel 118 (detecting and parsing at least one LSU_CA PDU 300) even under worst case time of day offset conditions by each transmitting at least D (N+2) LSU_CA PDUs over the assigned ALE channel, e.g., where N is the number of ALE channels 118a-d in the scanlist 200, and D ($d_{min}$) is the asynchronous mode minimum dwell time (e.g., in milliseconds).

Figure 4:
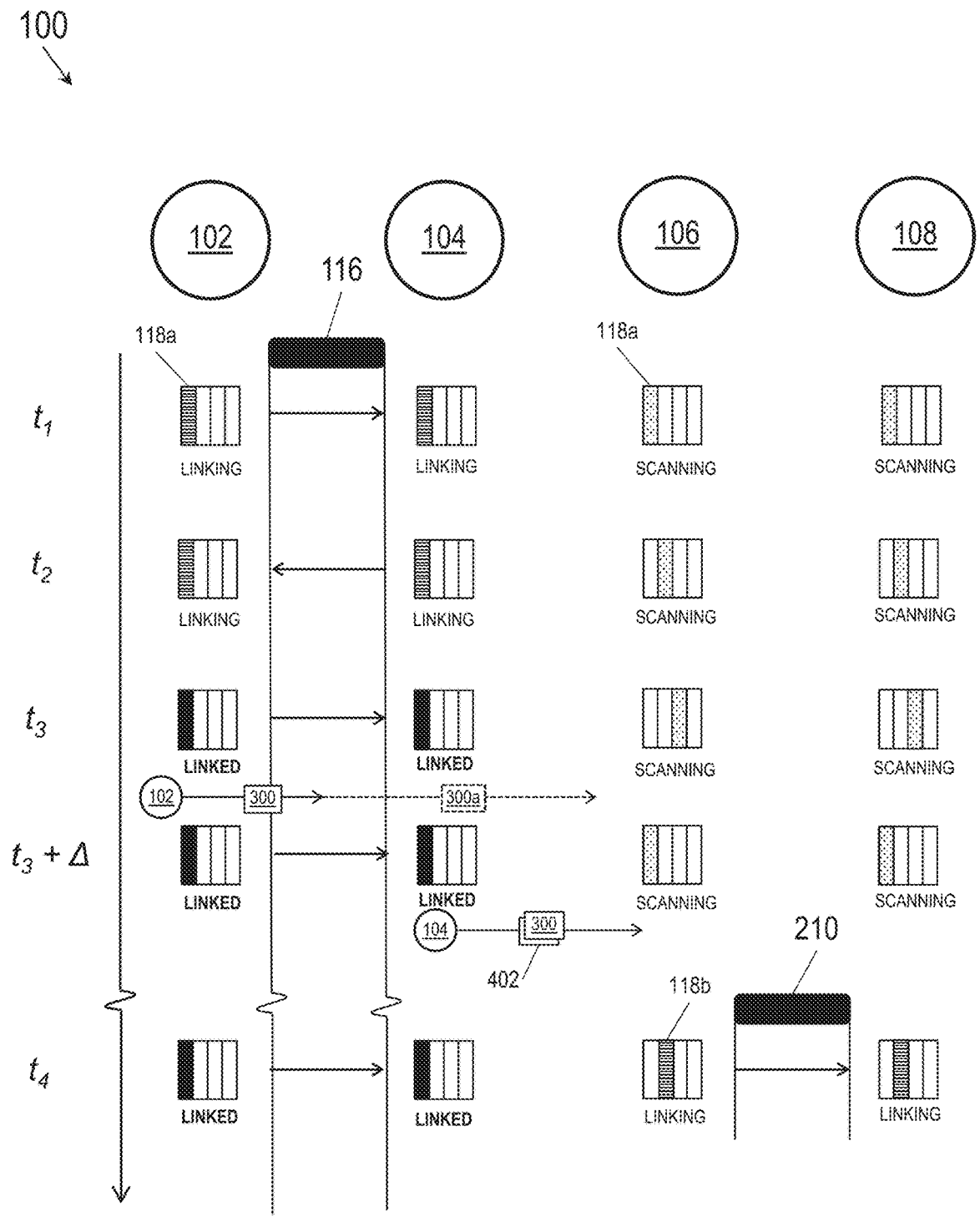
FIG. 4 is a diagrammatic illustration of collision avoidance operations incorporating the PDU of FIG. 3 within the ALE network of FIG. 1.

FIG. 4—Collision Avoidance Diagram

Referring now to FIG. 4, the ALE network 100 is shown.

In embodiments, the ALE network 100 may be implemented and may function similarly to the ALE network 100 shown by FIG. 2, except that as shown by FIG. 4, at a time $t_3+\Delta$ subsequent to completion of link setup operations at time $t_3$ but prior to the initiation of user data transmission at time $t_4$, the calling PU 102 and called PU 104 may both transmit the LSU_CA PDU 300 for the benefit of proximate PUs 106, 108 within the ALE network 100. For example, the PU 106, which is a one-hop neighbor of, and in the coverage area of, the called PU 104, may stop scanning the assigned ALE channel 118a upon detection of the preamble of the LSU_CA PDU 300. In embodiments, the PU 106 may parse the LSU_CA PDU 300, logging Rx sub-channel information indicated by the linked Rx sub-channel field (310, FIG. 3).

In embodiments, when the PU 106 initiates a subsequent linked call 210 to the PU 108, if the maximum duration indicated by the link duration field (304, FIG. 3) has not expired and the PU 106 is not otherwise excepted from collision avoidance as discussed above, the PU 106 may avoid link setup or user data transmissions over the sub-channel vectors (122, FIG. 1) negotiated for reception by the called PU 104, preventing any undue potential interference (212, FIG. 2) with the linked call 116. For example, the PU 106 may instead initiate link setup and the subsequent linked call 210 with the PU 108 over the ALE channel 118b.

In embodiments, a PU of the ALE network 100 may adjust its transmission power when transmitting the LSU_CA PDU 300 in order to adjust the area of collision avoidance with respect to an initiated linked call 116. For example, the calling PU 102 may have only one one-hop neighbor within its coverage area, e.g., the called PU 104. In some embodiments, the calling PU 102 may increase its transmission power when transmitting the LSU_CA PDU (300a) in order to reach a larger coverage area (e.g., the PU 106, which lies outside the coverage area of the calling PU) or, e.g., if the linked call 116 is associated with a particularly low tolerance for interference.

In some embodiments, either the calling PU 102 or the called PU 104 may append text messages or other like PDUs (402) to a transmitted LSU_CA PDU 300.

Figure 5:
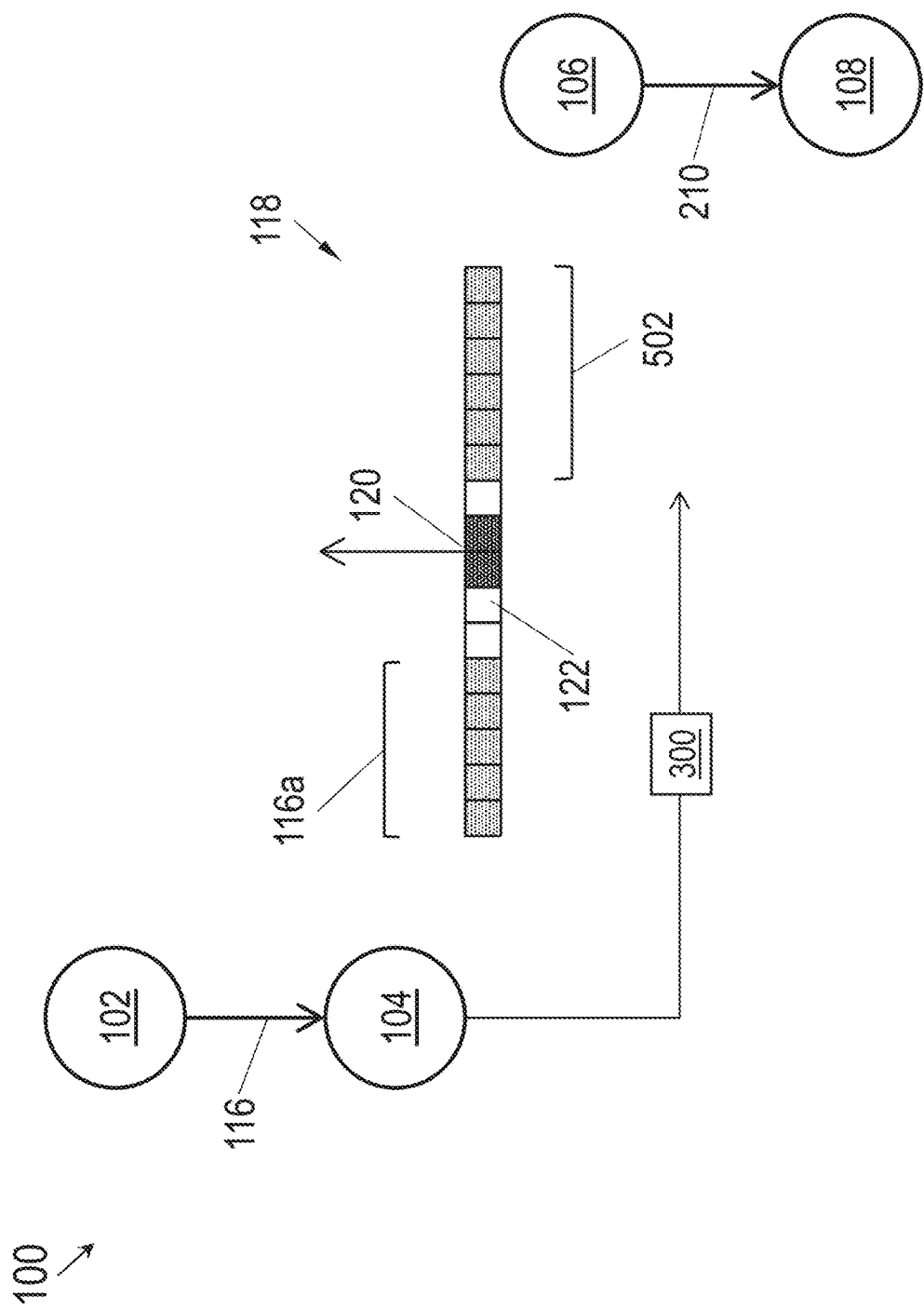
FIG. 5 is a diagrammatic illustration of channel sharing by participating units of the ALE network of FIG. 4.

FIG. 5—4G Ale Channel Splitting

Referring also to FIG. 5, the ALE network 100 is shown.

Conventional approaches to the hidden node problem, particularly carrier-sense multiple access with collision avoidance (CSMA/CA) in 802.11 systems, may provide collision avoidance and prevent hidden-node problems via the use of request-to-send (RTS) and clear-to-send (CTS) exchanges. For example, any neighboring node detecting an RTS-CTS exchange may cease transmission entirely to prevent interference. However, RTS-CTS exchanges may create additional challenges such as exposed-node scenarios, e.g., in asynchronous networks whereby a neighboring node may detect an RTS message but not the corresponding CTS message and may therefore cease transmitting whether or not there is an actual potential for interference. In addition, CSMA/CA may preclude any use of an assigned channel by more than one node, whether or not such use would present potential interference.

In embodiments, the PU 106 may detect and parse the LSU_CA PDU 300 transmitted by the called PU 104 while scanning (e.g., dwelling on) the assigned ALE channel 118 (e.g., a 48 kHz, 16-element 4G ALE/WALE channel). For example, the PU 106 may determine (e.g., from the linked Rx sub-channel field (310, FIG. 3)) that, pursuant to the linked call 116, the called PU 104 will be receiving on a 15 kHz reception channel (116a; e.g., the Tx channel with respect to the calling PU 102) 9 kHz to 24 kHz lower than the assigned frequency 120 (e.g., comprising 5 adjacent sub-channel vectors 122). In embodiments, automatic channel selection (ACS) at the PU 106 may determine that the assigned ALE channel 118 is the best option for transmitting pursuant to the subsequent linked call 210. While, for example, a collision avoidance approach similar to CSMA/CA may preclude any transmission over the assigned ALE channel 118, in embodiments the PU 106 may perform link setup operations, and transmit user data pursuant to the subsequent linked call 210, over an 18 kHz transmission channel (502) comprising 6 adjacent sub-channel vectors 122 at the opposite end of the assigned ALE channel, e.g., in a range from 6 kHz to 24 kHz above the assigned frequency 120 that does not create potential interference (212, FIG. 2) with the linked call 116. Accordingly, the ALE network 100 does not prevent the called PU 104 and the PU 106 from using the same assigned ALE channel 118 for two linked calls 116, 210, while preventing the subsequent linked call 210 from creating potential interference 212 with the prior linked call 116.

FIG. 6—Method

Figure 6:
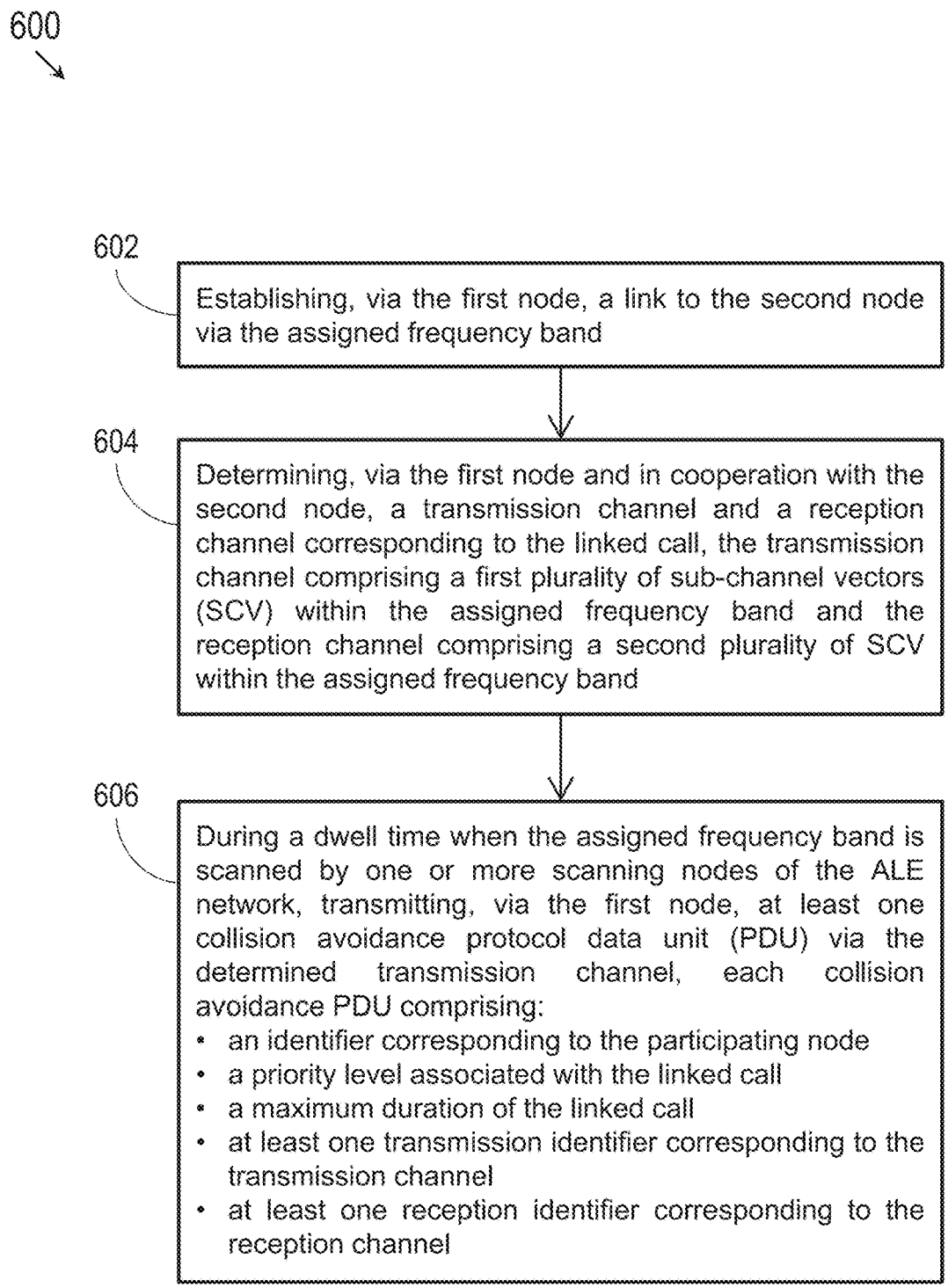
FIG. 6 is a flow diagram illustrating a method for collision avoidance between participating units of an ALE network according to example embodiments of this disclosure.

Referring to FIG. 6, the method 600 may be implemented by the ALE network 100 and may include the following steps.

At a step 602, the calling PU (node) receives an assigned frequency band (e.g., ALE channel) for a linked call between the calling PU and a called PU of the ALE network (e.g., by automatic channel selection (ACS) at the calling PU).

At a step 604, the calling PU and called PU perform link setup operations to establish a secure link for the linked call on the assigned frequency band.

At a step 606, the calling PU and called PU mutually negotiate transmission and reception channels (e.g., frequency bands of sub-channel vectors dedicated for calling PU-to-called PU and called PU-to-calling PU communications respectively) and bit error rate (BER) performance for the linked call over the assigned ALE channel.

At a step 608, the calling PU, after the link setup handshake has been completed for the linked call over the assigned ALE channel and before user data transmission commences, transmits link setup collision avoidance (LSU_CA) protocol data units (LSU_CA PDU) for detection and decoding by proximate PUs of the ALE network. Each LSU_CA PDU includes an address identifying the transmitting PU (e.g., the calling PU or the called PU); the priority level of the linked call; the maximum duration of the linked call; and linked Tx/Rx sub-channel vector fields identifying the sub-channel vectors of the assigned ALE channel dedicated for transmission and for reception (e.g., from the perspective of the transmitting node; if the LSU_CA PDU is transmitted by the calling PU, the linked Tx sub-channel vector field identifies sub-channel vectors for calling PU-to-called PU transmissions and the linked Rx sub-channel vector field identifies sub-channel vectors for called PU-to-calling PU transmissions). In some embodiments, the transmitting PU may increase or decrease its transmission power before transmitting the LSU_CA PDU to expand or contract an area of potential collision avoidance. In some embodiments, the transmitting PU may append text messages or other PDUs to the LSU_CA PDU. In some embodiments, the ALE network may not be a time-synchronous network, and the asynchronous calling PU and called PU may each transmit at least D (N+2) LSU_CA PDUs (e.g., where D is a minimum dwell time ($d_{min}$) and N is the number of ALE channels on the ALE network scanlist) to ensure all other scanning PUs of the ALE network will scan the ALE channel even under worst-case time of day conditions. In some embodiments, the transmitting PU is the called PU, and the LSU_CA PDU is transmitted via its transmission channel (e.g., the reception channel of the calling PU).

Conclusion

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A participating node of an Automatic Link Exchange (ALE) network, comprising an ALE radio system configured to:
    establish a link to a partner node of the ALE network via a frequency band assigned for a linked call between the participating node and the partner node;
    determine a transmission channel and a reception channel corresponding to the linked call, the transmission channel comprising a first plurality of sub-channel vectors (SCV) within the assigned frequency band and the reception channel comprising a second plurality of SCV within the frequency band;

and during a dwell time when the assigned frequency band is scanned by one or more scanning nodes of the ALE network, transmit via the transmission channel at least one collision avoidance protocol data unit (PDU) comprising:

an identifier corresponding to the participating node;

a priority level associated with the linked call;

a maximum duration of the linked call;

at least one transmission identifier corresponding to the transmission channel;

and at least one reception identifier corresponding to the reception channel.

2. The participating node of claim 1, wherein:

the ALE network is not a time-synchronized network;

and wherein the participating node is configured to transmit at least D (N+2) collision avoidance PDUs, where D is a time duration of the dwell time and N is an integer number of channels in a scan list corresponding to the ALE network.

3. The participating node of claim 1, wherein the at least one collision avoidance PDU includes at least one appended text message.

4. The participating node of claim 1, wherein the participating node is configured for one of increasing or decreasing a transmission power of the at least one collision avoidance PDU based on at least one of a desired collision avoidance range or an interference tolerance of the linked call.

5. The participating node of claim 1, wherein the participating node is a caller node of the linked call.

6. The participating node of claim 1, wherein the participating node is a receiver node of the linked call.

7. A method for collision avoidance between participating nodes of an Automatic Link Exchange (ALE) network, the method comprising:

establishing, via a first node of an ALE network, a link to a second node of the ALE network via an assigned frequency band corresponding to a linked call between the first node and the second node;

determining, via the first node in cooperation with the second node, a transmission channel and a reception channel corresponding to the linked call, the transmission channel comprising a first plurality of sub-channel vectors (SCV) within the assigned frequency band and the reception channel comprising a second plurality of SCV within the assigned frequency band;

and during a dwell time when the assigned frequency band is scanned by one or more scanning nodes of the ALE network, transmitting, via the first node, at least one collision avoidance protocol data unit (PDU) via the determined transmission channel, each collision avoidance PDU comprising:

an identifier corresponding to the participating node;

a priority level associated with the linked call;

a maximum duration of the linked call;

at least one transmission identifier corresponding to the transmission channel;

and at least one reception identifier corresponding to the reception channel.

8. The method of claim 7, wherein establishing, via a first node of an ALE network, a link to a second node of the ALE network via an assigned frequency band corresponding to a linked call between the first node and the second node includes:

determining, via the first node, the assigned frequency band via automatic channel selection (ACS).

9. The method of claim 7, wherein establishing, via a first node of an ALE network, a link to a second node of the ALE network via an assigned frequency band corresponding to a linked call between the first node and the second node includes:

receiving, via the first node, the assigned frequency band from an operator of the ALE network.

10. The method of claim 7, wherein transmitting, via the first node, at least one collision avoidance protocol data unit (PDU) via the determined transmission channel includes:

transmitting, via a calling PU of the linked call, the at least one collision avoidance PDU) via the transmission channel.

11. The method of claim 7, wherein transmitting, via the first node, at least one collision avoidance protocol data unit (PDU) via the determined transmission channel includes:

transmitting, via a called PU of the linked call, the at least one collision avoidance PDU via the transmission channel.

12. The method of claim 7, wherein transmitting, via the first node, at least one collision avoidance protocol data unit (PDU) via the determined transmission channel includes:

adjusting a transmission power of the collision avoidance PDU based on at least one of a desired collision avoidance range or an interference tolerance of the linked call.

13. The method of claim 7, wherein transmitting, via the first node, at least one collision avoidance protocol data unit (PDU) via the determined transmission channel includes:

appending at least one text message to the at least one collision avoidance PDU.

14. The method of claim 7, wherein the ALE network is not a time-synchronized network, and transmitting, via the first node, at least one collision avoidance protocol data unit (PDU) via the determined transmission channel includes:

transmitting, via the first node, at least D (N+2) collision avoidance PDUs, where D is a time duration of the dwell time and N is an integer number of channels in a scan list corresponding to the ALE network.

* * * * *